United States Patent [19]

Buschmann

[11] Patent Number: 4,483,463
[45] Date of Patent: Nov. 20, 1984

[54] APPARATUS FOR DISPENSING VERY SMALL QUANTITIES OF LIQUID

[75] Inventor: Gerhard Buschmann, Dusseldorf, Fed. Rep. of Germany

[73] Assignee: Jagenberg AG, Dusseldorf, Fed. Rep. of Germany

[21] Appl. No.: 403,609

[22] Filed: Jul. 30, 1982

[30] Foreign Application Priority Data

Oct. 12, 1981 [DE] Fed. Rep. of Germany ....... 3140485

[51] Int. Cl.³ .............................................. B67D 5/08
[52] U.S. Cl. ....................................... 222/64; 239/61; 222/630; 73/304 C; 137/392; 361/284
[58] Field of Search ................. 222/23, 40, 56, 64–66, 222/71, 52, 630; 340/620; 361/284; 73/304 C; 137/392; 239/61

[56] References Cited

U.S. PATENT DOCUMENTS

| | | | |
|---|---|---|---|
| 2,375,084 | 5/1945 | Coroniti et al. | 361/284 |
| 3,224,638 | 12/1965 | Harrell | 222/64 |
| 3,321,971 | 5/1967 | Llewellyn et al. | 73/304 C |
| 3,391,547 | 7/1968 | Kingston | 73/304 C |
| 4,223,806 | 9/1980 | Buschmann | 222/23 |

*Primary Examiner*—H. Grant Skeggs
*Attorney, Agent, or Firm*—Sprung, Horn, Kramer & Woods

[57] ABSTRACT

Apparatus for the dispensing of very small amounts of liquid includes a measuring vessel which can be filled with an amount of liquid, and to whose outlet there is connected an ejector of a partial quantity. A sensor responds to the liquid level in the measuring vessel, to control a filling system which receives therefrom a signal for the filling of the measuring vessel when the minimum permissible lower liquid level is reached and a signal for the ending of the filling process when the maximum permissible upper liquid level is reached. The sensor is a capacitor which extends at least over the entire range of the variable liquid level in the measuring vessel and whose dielectric is the liquid situated in the measuring vessel. A capacitance meter is provided for measuring the capacitance of the capacitor.

7 Claims, 1 Drawing Figure

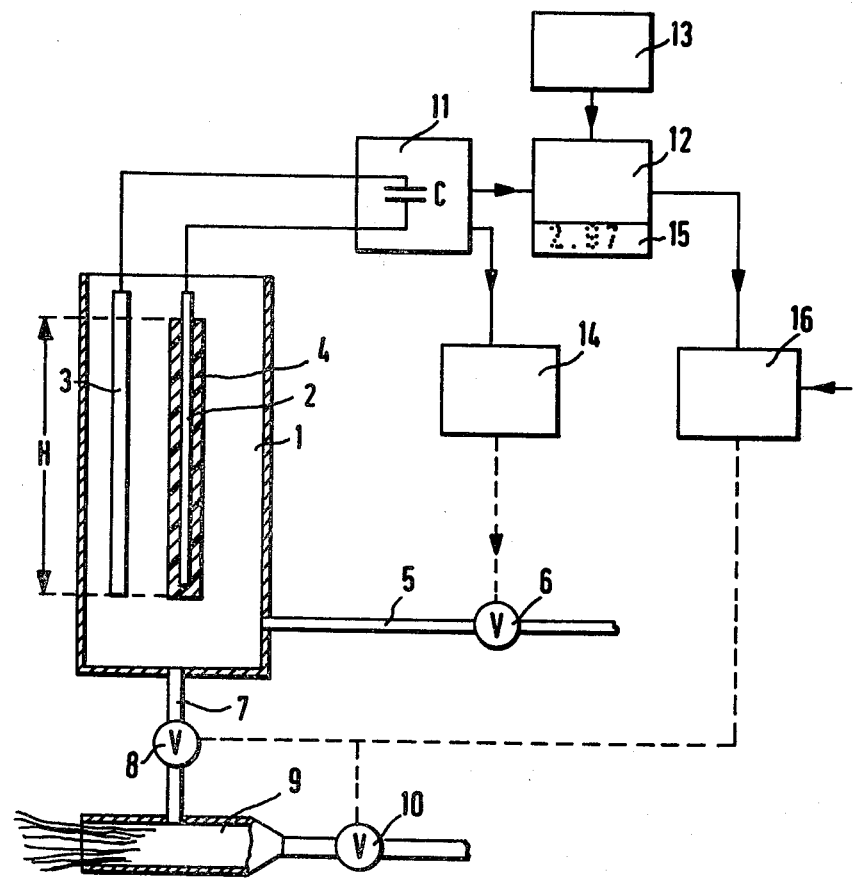

APPARATUS FOR DISPENSING VERY SMALL QUANTITIES OF LIQUID

BACKGROUND OF THE INVENTION

The present invention relates to an apparatus for the pulsed dispensing of very small quantities of liquid, consisting of a measuring vessel which can be filled with a larger quantity of liquid and to whose outlet a means for the emission of a portion of that quantity is connected, and of a sensing means responding to the level of liquid in the measuring vessel.

Such an apparatus is known from U.S. Pat. No. 4,223,806. It serves for the spray injection of hydrogen peroxide into containers to sterilize them. As a rule, 0.3 $cm^3$ of hydrogen peroxide suffices for the sterilization of a plastic-coated carton intended to serve as a container for one liter of milk. In order to achieve effective sterilization economically, it is necessary to control these quantities accurately. This requirement is satisfied by the known apparatus. With the known apparatus, however, it is possible only to average the quantity of liquid dispensed per container, since only the total capacity of the measuring vessel can be measured instrumentally. If on account of some fault, one of the containers is not sprayed with disinfectant, but slightly more disinfectant is dispensed to the others, such an error is not detected.

SUMMARY OF THE INVENTION

It is the object of the invention to create an apparatus of the kind mentioned above, with which the quantity of liquid dispensed can be detected more accurately than heretofore.

This object is achieved in accordance with the invention by the fact that the sensing apparatus has a capacitor which extends at least over the entire range of the variable liquid level in the vessel and whose dielectric is the liquid contained in the vessel, and the sensing apparatus also has a means for measuring the capacitance of the capacitor.

Unlike the known apparatus, in the apparatus of the invention it is not the average quantity of liquid dispensed in a plurality of dispensing actions that is determined, but the quantity of liquid that is issued in each dispensing action. The change in the capacitance of the capacitor is used as the measure of the amount of liquid dispensed.

To be independent of the conductivity of the liquid, the capacitor should have at least one electrode that is electrically insulated from the liquid. The capacitance of the capacitor can be used for various controlling purposes, such as for example, for the filling of the measuring vessel with liquid. In order to obtain particularly definite values for the signals that are then necessary when a maximum level is reached (signal to shut off the filling action) and when a minimum level is reached (signal to start refilling), the electrode should be electrically insulated only up to the maximum allowable liquid level. In this case, when the vessel is refilled, there is an abrupt change in the capacitance as soon as the liquid level rises above the insulated part of the electrode. Likewise there is an abrupt change in the capacitance when the liquid level drops below the electrode.

There are a number of possibilities for the construction of the electrode. Preferably the electrode is disposed in the vessel in the form of a rod or plate and the counter-electrode is the wall of the vessel or a rod or plate disposed in the vessel.

The capacitance measurement can be accomplished in a simple manner by making the capacitance measuring means consist of a frequency meter and an oscillator in whose tank circuit the capacitor is the element that determines the frequency.

The change in the liquid level can be determined very precisely with a comparator for the detection of the change in capacitance or frequency. An appropriate comparator is an up/down counter cycled by a pulse generator and having its input opened after each emission of liquid for the duration of a certain number of oscillations of the counting pulse oscillator. If a pulse forming network for forming rectangular pulses is associated with the oscillator, the counter can be operated very precisely.

Since each emission of liquid is measured, errors can be compensated for more rapidly than before. It is preferable, therefore, for the comparator to deliver the signal corresponding to the quantity of liquid as a measured value to a regulating means for the adjustment of the ejector means.

BRIEF DESCRIPTION OF THE DRAWING

The invention will be further explained below with the aid of a drawing which is a diagrammatic representation of one of its embodiments.

DETAILED DESCRIPTION OF THE INVENTION

In a measuring vessel 1 which can be filled with a disinfecting agent such as hydrogen peroxide, two rod-like electrodes 2 and 3 are disposed parallel to one another and to the axis of the vessel. One of the two electrodes 2 and 3 is concealed in an insulating jacket 4. The jacket 4 extends over a height H from a bottom level to an upper level. The measuring vessel 1 can be filled with disinfectant from a reservoir, which is not shown, through a line 5 having a remotely controlled valve 6. The disinfectant is delivered from the measuring vessel 1 in pulses through a line 7 with a remotely controlled valve 8 to ejector means in the form of an injector 9 which can be air-driven through a remotely controlled valve 10.

The two electrodes 2 and 3, between which disinfectant acts as a dielectric, form a capacitor which is connected in parallel to a capacitor C of the tank circuit of an oscillator 11. The oscillator 11, which is equipped with a pulse forming network, delivers square-wave pulses to a counter 12 which receives counting pulses from a counting pulse generator 13. The counter 12 is in the form of an up/down counter.

According to the level of the disinfectant in the measuring vessel 1, the capacitance of the capacitor formed by the electrodes 2 and 3 varies, and with it the frequency of oscillation of the oscillator 11. When the liquid level rises above the insulating jacket 1, then, depending on the conductivity of the disinfectant, a short-circuit, in the extreme case, develops between the electrodes 3 and 4. The oscillator then stops oscillating. In any case, however, an abrupt change in capacitance occurs at the transition from the uninsulated part of the electrode 2 to the insulated part, and this manifests itself in an abrupt change in frequency. An abrupt change in frequency also results when the liquid level drops below the bottom ends of the electrodes 2 and 3. In the area in between, the frequency changes continuously with the level of the liquid.

The abrupt changes in frequency are received by a control unit 14 which controls the feed of liquid to fill the measuring vessel 1. If the surface of the liquid drops to the bottom level, the valve 6 is opened and liquid is let into the measuring vessel 1. As soon as the surface of the liquid reaches the upper end of the insulating jacket 4, the control unit 14 shuts the valve 6.

When the ejector means takes liquid from the measuring vessel in the range between these liquid levels, a measurement of capacitance or frequency takes place after each issue. This is accomplished by the fact that the counter 12 is opened for counting pulses from the counting pulse generator 13 for the duration of one rectangular pulse or of a certain number of rectangular pulses of the oscillator 11. The number that is counted is stored. After the next emission of liquid, the counter 12 is opened for the duration of one rectangular pulse or of a certain equal number of rectangular pulses. In this case the counter 12 counts backward, so that from these two counts a difference results which is a measure of the amount of liquid issued. This amount of liquid is indicated in a display 15.

The measurement that is made can also be used for the purpose of correcting an incorrect emission of liquid due to undesirable influences. In this case, regulator means 16 is provided, which receives a reference value S which it compares with the measured value. In the event of a difference between the two, the regulator means gives an adjusting signal to the values 8 and 10.

It will be appreciated that the instant specification and claims are set forth by way of illustration and not limitation, and that various modifications and changes may be made without departing from the spirit and scope of the present invention.

What is claimed is:

1. In an apparatus for dispensing small amounts of liquid having a measuring vessel which is fillable between a maximum and minimum liquid level with a liquid to be dispensed, a means receptive of the liquid from the measuring vessel for ejecting a partial quantity and means for sensing the liquid level in the measuring vessel and for producing a signal when the minimum liquid level is reached to effect refilling and a signal when the maximum liquid level is reached to effect termination of filling, the improvement wherein: the sensing means comprises a capacitor extending over at least the range of the variable liquid level in the measuring vessel between the minimum and maximum levels, with the dielectric of the capacitor comprising the liquid in the measuring vessel, means for measuring the capacitance of the capacitor comprising means for comparing the measured values after each emission of liquid to determine the quantity of liquid dispensed as a function of the change and regulating means responsive to the actual volume of liquid dispensed as determined by the comparing means for adjusting the ejecting means to dispense a preselected volume when the actual volume differs from the preselected volume.

2. The apparatus according to claim 1, wherein the capacitor has at least one electrode that is electrically insulated from the liquid.

3. The apparatus according to claim 2, wherein the insulation extends only to the maximum liquid level.

4. The apparatus according to claim 2 or 3, wherein one electrode in the vessel comprises a first member and the counterelectrode therefor comprises the vessel wall.

5. The apparatus according to claims 2 or 3, wherein one electrode in the vessel comprises a first member and the counterelectrode therefor comprises a second member disposed in the vessel.

6. The apparatus according to claim 1, wherein the capacitance measuring means comprises an oscillator having a tank circuit and wherein the capacitor is the frequency-determining element of the tank circuit and means for measuring the frequency of the oscillator.

7. The apparatus according to claim 6, wherein the comparing means comprises an up/down counter and a counting pulse generator connected to the input thereof, wherein the input of the counter is opened after each emission of liquid for the duration of at least one oscillation of the oscillator for counting pulses.

* * * * *